United States Patent [19]

Riedel

[11] 4,365,364

[45] Dec. 28, 1982

[54] TOILET FLUSH CONTROL USING A HOLLOW CROWN INSTANT CLOSE FLAPPER VALVE

[76] Inventor: Rudolph T. Riedel, 7198 Sugarbin Ave., Orlando, Fla. 32807

[21] Appl. No.: 278,365

[22] Filed: Jun. 29, 1981

[51] Int. Cl.³ .............................................. E03D 1/34
[52] U.S. Cl. ........................................ 4/378; 4/392; 4/393; 4/382; 4/324
[58] Field of Search ................... 4/324, 325, 326, 382, 4/392, 393, 402, 403, 395, 405, 378

[56] References Cited

U.S. PATENT DOCUMENTS

| | | | |
|---|---|---|---|
| 2,059,749 | 11/1936 | Rosewood | 4/394 |
| 2,158,452 | 5/1939 | Winship | 4/402 |
| 2,779,028 | 1/1957 | Branch | 4/393 |
| 3,036,313 | 5/1962 | Jenkins | 4/324 |
| 3,239,848 | 3/1966 | Zrolka | 4/393 |
| 3,707,733 | 1/1973 | Gore et al. | 4/393 |
| 3,719,957 | 3/1973 | Riedel | 4/405 |
| 3,831,204 | 8/1974 | Cook | 4/324 X |
| 3,921,226 | 11/1975 | Macdonald | 4/324 |
| 3,996,629 | 12/1976 | Riedel | 4/395 X |
| 4,293,964 | 10/1981 | Riedel | 4/378 |

*Primary Examiner*—Henry K. Artis
*Attorney, Agent, or Firm*—Julian C. Renfro

[57] ABSTRACT

A demand type flush tank control for saving water by the utilization of a water release valve of the flapper type in the water storage tank of a toilet, with such flapper valve being non-buoyant such that it will close off the flow of water from the tank into the toilet the instant the flush handle has been released by the user. In this way, the use of the entire contents of the tank is prevented, except on those occasions where a full tank is actually needed. My novel flapper valve has no air pocket below the sealing area, as do conventional flapper valves, and it is non-buoyant in that a cavity is provided in the upper part of the valve, through which water can enter a part of the valve body. Accordingly, my novel flapper valve readily returns to its seat the moment the toilet handle is released, thereby effecting a daily savings of many gallons of water.

3 Claims, 4 Drawing Figures

TOILET FLUSH CONTROL USING A HOLLOW CROWN INSTANT CLOSE FLAPPER VALVE

RELATIONSHIP TO PREVIOUS INVENTIONS

This invention bears a definite relationship to my U.S. Pat. No. 3,719,957, which issued Mar. 13, 1973, and to my U.S. Pat. No. 3,996,629, which issued Dec. 14, 1976, as well as to my pending application entitled "Improved Design for Flush Tank Control using Non-Buoyant Flapper Valve", Ser. No. 183,287, now U.S. Pat. No. 4,293,964.

BACKGROUND OF THE INVENTION

This invention relates to a flush tank control arrangement for a toilet such that only that volume of water actually required for accomplishing the flushing of a toilet, or the neutralization of liquid waste, in a given instance need be utilized.

In the past, other devices have been proposed for limiting the flow of water from the water storage tank of the toilet, but many of these have been complex and expensive devices, requiring installation by a professional. Such devices have included arrangements involving the use of primary and secondary floats and accompanying linkages, as well as arrangements in which the handle of the tank must be substantially modified.

My U.S. Pat. No. 3,719,957 represented a substantial improvement over the devices of the prior art in that it made it possible to limit the amount of water released without involving any costly modifications. On the other hand, however, the device in accordance with that patent could not fully control certain types of water release valves, and furthermore it was susceptible to unauthorized removal when utilized in public places.

My U.S. Pat. No. 3,996,629 also represented a substantial advance in the state of the art, in that it taught some very effective means for limiting the movements of two different types of water release valves, but such means were appendages with respect to the original mechanism of the toilet, and needed a degree of adjustment following their installation in order to operate properly.

It was to improve upon these earlier devices that this present device was evolved.

SUMMARY OF THE INVENTION

The present invention involves a device designed to update the water wasting toilets of the prior art, and represents a substantial improvement thereover in that it is a flapper type water release valve that closes promptly upon release of the toilet handle, which means that the utilization of an unnecessary amount of water is avoided.

My flapper type valve, in its simplest form, utilizes no air pocket, which means that it cannot become free floating. By its operation thus being under close control of the flush handle, the user can release merely three or four quarts of water at a time in the event that liquid waste is to be neutralized, whereas he or she can flush away solid waste by the use of approximately two and a half gallons of water. As is therefore to be seen, a great saving of water is effected in that the full five gallon contents of the toilet tank need not be released except on those occasions in which such is really necessary.

It is therefore a primary object of my invention to provide an easily installed flapper valve that will serve to minimize the amount of water expended in the flushing of a toilet to eliminate solid waste, or for the neutralization of liquid waste, thereby effecting a substantial conservation of water.

It is another important object of my invention to provide an easily installed flapper valve of a novel type that is not dependent upon any additional devices in realizing the goal of minimizing the amount of water expended in the flushing of a toilet, thereby making it possible to conserve substantial amounts of fresh water.

It is another object of my invention to provide a flapper valve that can be furnished either as original equipment, or as a novel water saving replacement in an older toilet, without the employment of any complicated tools or extraordinary talent being involved.

These and other objects, features and advantages will become more apparent as the description proceeds.

DETAILED DESCRIPTION

Figure 1:
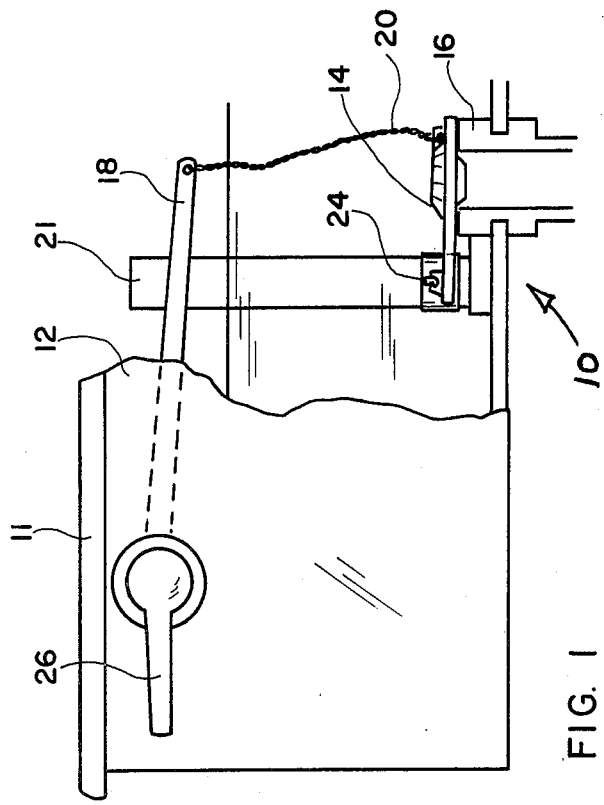
FIG. 1 is a side elevational view of a toilet tank that has been sectionalized in order to reveal the installation therein of a novel hollow crown flapper valve in accordance with this invention.
Figure 4:
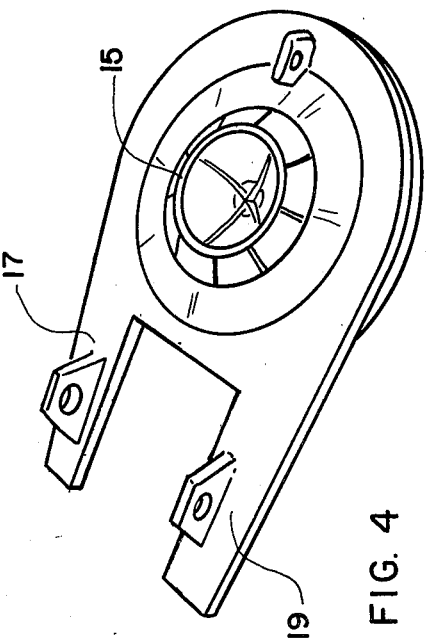
FIG. 4 is a perspective view to a larger scale, showing the hollow crown topside of the same non-buoyant flapper valve.

Turning to FIG. 1, it will there be seen that I have illustrated a flush arrangement 10 of the kind associated with the type of toilet utilizing a water storage tank 11. Water from this tank is of course released by the user's manipulation of a handle 26, which serves to bring about a movement of the water release valve 14 from the valve seat 16.

Figure 2:
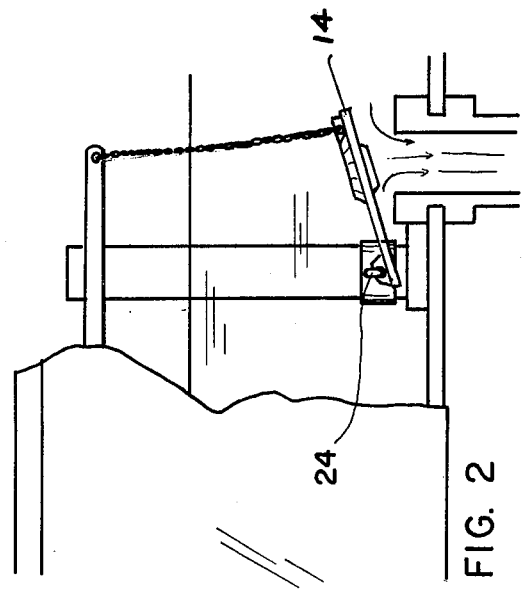
FIG. 2 is a view similar to FIG. 1, but revealing the flapper valve having been raised to the flushing position.
Figure 3:
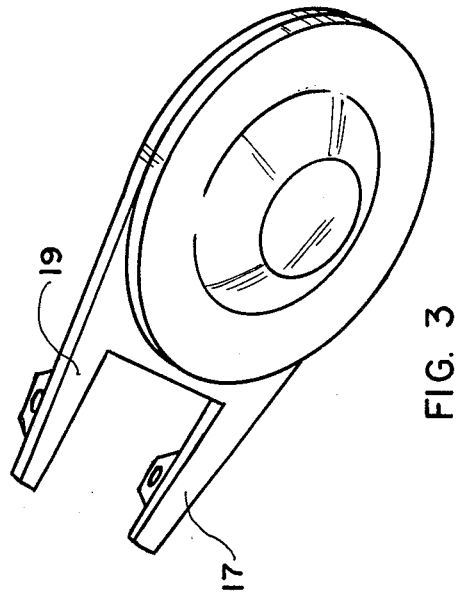
FIG. 3 is a perspective view to a larger scale, showing the underside of my novel flapper valve, without an air pocket.

The sidewall 12 of the tank is cut away in FIG. 1 and in related FIG. 2, in order to reveal the presence of an arm 18 attached to the handle 26, with the arrangement being such that pressing down upon the handle causes the arm 18 to raise. The linkage 20 attached adjacent the remote end of the arm connects to the end of a novel water release valve 14 of the flapper type. In accordance with this invention, valve 14 is distinctively different from ordinary flapper valves in that it has no air pocket to give it buoyancy, and it therefore cannot become free floating.

Also revealed in FIG. 1 is the use of a vertically disposed overflow tube 21, which is preferably a one piece molded component that includes the valve seat 16. The tube is typically approximately ten inches high and 1 inch in diameter. On each side of the base of the component is a hook 24, with these hooks being designed to serve as the pivotal support for my novel flapper valve.

In FIG. 2, I illustrate how upon the raising of arm 18, the flapper valve 14 is caused to pivot about its mounting, and raise to permit the flow of water from the tank 11 into the toilet bowl (not shown).

It is important to note that the flapper valve 14 in accordance with this invention will remain in the raised position only as long as the handle 26 is held down, for I have deliberately designed the flapper valve 14 to be non-buoyant such that it will close immediately upon release of the handle. In this way, I achieve a truly remarkable saving of water, for in most instances, only approximately 2 or 3 quarts of water will be sufficient to neutralize liquid waste, and only 2½ gallons will usually be sufficient to flush solid waste away.

Although I am not to be limited to any certain flapper valve, I prefer to use one having a hollow crown portion 15, that is approximately 1¼ inches in diameter and one inch deep, and that utilizes a sealing portion 19 approximately 3 inches in diameter. The valve has arms 17 that are each approximately one and one-half inches long. As will be noted from the drawings, arms 17 are provided with mounting holes such that they can be pivotally secured upon the pins or hooks 24 located near the bottom of the overflow tube 21.

A preferred design of my flapper valve involves its weight being kept at about 1½ ounces, by in effect using the same amount of rubber as the cut away air pocket in order to strengthen the sealing edge. This flapper valve weight of 1½ ounces I have found to be the amount necessary to return the flapper valve to its seat immediately upon release of the flush tank handle. As is thus to be seen, effective control of the flapper valve by movement of the flush tank handle has now been achieved.

The downward pressure of the water on the flapper valve coupled with the suction of water outflow below the valve plus the weight of the valve itself are sufficient to consistently and rapidly close the valve as soon as the handle has been released.

I claim:

1. A flush arrangement for preventing the utilization of an unnecessary amount of water in the flushing of a toilet of the type having a water storage tank and a handle movable to bring about a lifting of a water release device from its seat to accomplish a flushing of the toilet, said water release device being a pivotally mounted flapper valve, said flapper valve being non-buoyant, and having a cavity in its upper portion into which water can enter and occupy at least a portion of the interior of the flapper valve, said flapper valve using no guides, weights or appendages, means connecting a portion of said flapper valve to the handle so that handle manipulation brings about a pivotal movement of said flapper valve away from its seat, thus to permit a controlled flow of water from the tank, said flapper valve, because of its non-buoyancy, and depending solely on downward water pressure from above, plus suction from outflowing water below, plus the density of the valve itself, returning to its seat as soon as the handle is released, such that the flow of water from the tank will be promptly shut off.

2. The flush arrangement as defined in claim 1 wherein said flapper valve utilizes a generally flat member having a sealing portion, in a central part of which the cavity is located.

3. The flush arrangement as defined in claim 1 wherein said flapper valve is made of plastic material.

* * * * *